(12) United States Patent
Kurts et al.

(10) Patent No.: US 9,696,997 B2
(45) Date of Patent: *Jul. 4, 2017

(54) REAL TIME INSTRUCTION TRACE PROCESSORS, METHODS, AND SYSTEMS

(71) Applicant: INTEL CORPORATION, Santa Clara, CA (US)

(72) Inventors: Tsvika Kurts, Haifa (IL); Ofer Levy, Atlit (IL); Itamar Kazachinsky, Netanya (IL); Gabi Malka, Haifa (IL); Zeev Sperber, Zichron Yackov (IL); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,658

(22) Filed: Jan. 11, 2016

(65) Prior Publication Data

US 2016/0117171 A1 Apr. 28, 2016

Related U.S. Application Data

(63) Continuation of application No. 13/730,834, filed on Dec. 29, 2012, now Pat. No. 9,262,163.

(51) Int. Cl.
*G06F 9/00* (2006.01)
*G06F 7/38* (2006.01)
(Continued)

(52) U.S. Cl.
CPC .......... *G06F 9/30145* (2013.01); *G06F 11/00* (2013.01); *G06F 11/3471* (2013.01);
(Continued)

(58) Field of Classification Search
None
See application file for complete search history.

(56) References Cited

U.S. PATENT DOCUMENTS 6,611,909 B1    8/2003   Roos et al.
8,074,131 B2   12/2011   Kurts et al.
(Continued)

FOREIGN PATENT DOCUMENTS

CN    101099141 A    1/2008
CN    102117247 A    7/2011
(Continued)

OTHER PUBLICATIONS

Office Action received for Korean Patent Application No. 10-2015-7014040, mailed on Mar. 31, 2016, 3 pages of English Translation and 4 pages of Korean Office Action.
(Continued)

*Primary Examiner* — Hyun Nam
(74) *Attorney, Agent, or Firm* — Vecchia Patent Agent, LLC

(57) ABSTRACT

A method of an aspect includes generating real time instruction trace (RTIT) packets for a first logical processor of a processor. The RTIT packets indicate a flow of software executed by the first logical processor. The RTIT packets are stored in an RTIT queue corresponding to the first logical processor. The RTIT packets are transferred from the RTIT queue to memory predominantly with firmware of the processor. Other methods, apparatus, and systems are also disclosed.

24 Claims, 11 Drawing Sheets

(51) Int. Cl.
  *G06F 9/30* (2006.01)
  *G06F 11/00* (2006.01)
  *G06F 11/36* (2006.01)
  *G06F 11/34* (2006.01)
  *G06F 13/40* (2006.01)

(52) U.S. Cl.
  CPC .......... *G06F 11/36* (2013.01); *G06F 13/4068* (2013.01); *G06F 2201/865* (2013.01)

(56) References Cited

U.S. PATENT DOCUMENTS

| | | | |
|---|---|---|---|
| 2007/0214341 A1* | 9/2007 | Das | G06F 11/3636 712/38 |
| 2008/0115115 A1 | 5/2008 | Codrescu et al. | |
| 2010/0287417 A1 | 11/2010 | Moyer et al. | |
| 2010/0322237 A1 | 12/2010 | Raja et al. | |
| 2012/0185676 A1 | 7/2012 | Horley et al. | |
| 2012/0185734 A1 | 7/2012 | Gilkerson et al. | |
| 2013/0263093 A1 | 10/2013 | Brandt et al. | |
| 2013/0297917 A1 | 11/2013 | Nguyen et al. | |
| 2014/0019733 A1 | 1/2014 | Brandt et al. | |
| 2014/0189256 A1 | 7/2014 | Kranich et al. | |

FOREIGN PATENT DOCUMENTS

| | | |
|---|---|---|
| KR | 10-2009-0027879 A | 3/2009 |
| KR | 10-2011-0075638 A | 7/2011 |
| WO | 2014/105168 A1 | 7/2014 |

OTHER PUBLICATIONS

Notice of Allowance received for U.S. Appl. No. 13/730,834, mailed on Oct. 2, 2015, 6 pages.
International Search Report received for PCT Patent Application No. PCT/US2013/047431, mailed on Oct. 7, 2013, 5 pages.
International Preliminary Report on Patentability and Written Opinion received for PCT Patent Application No. PCT/US2013/047431, mailed on Jul. 9, 2015, 7 pages.
Office Action received for Chinese Patent Application No. 201380062678.6, mailed on Dec. 2, 2016, 5 pages of Chinese Office Action Only.

\* cited by examiner

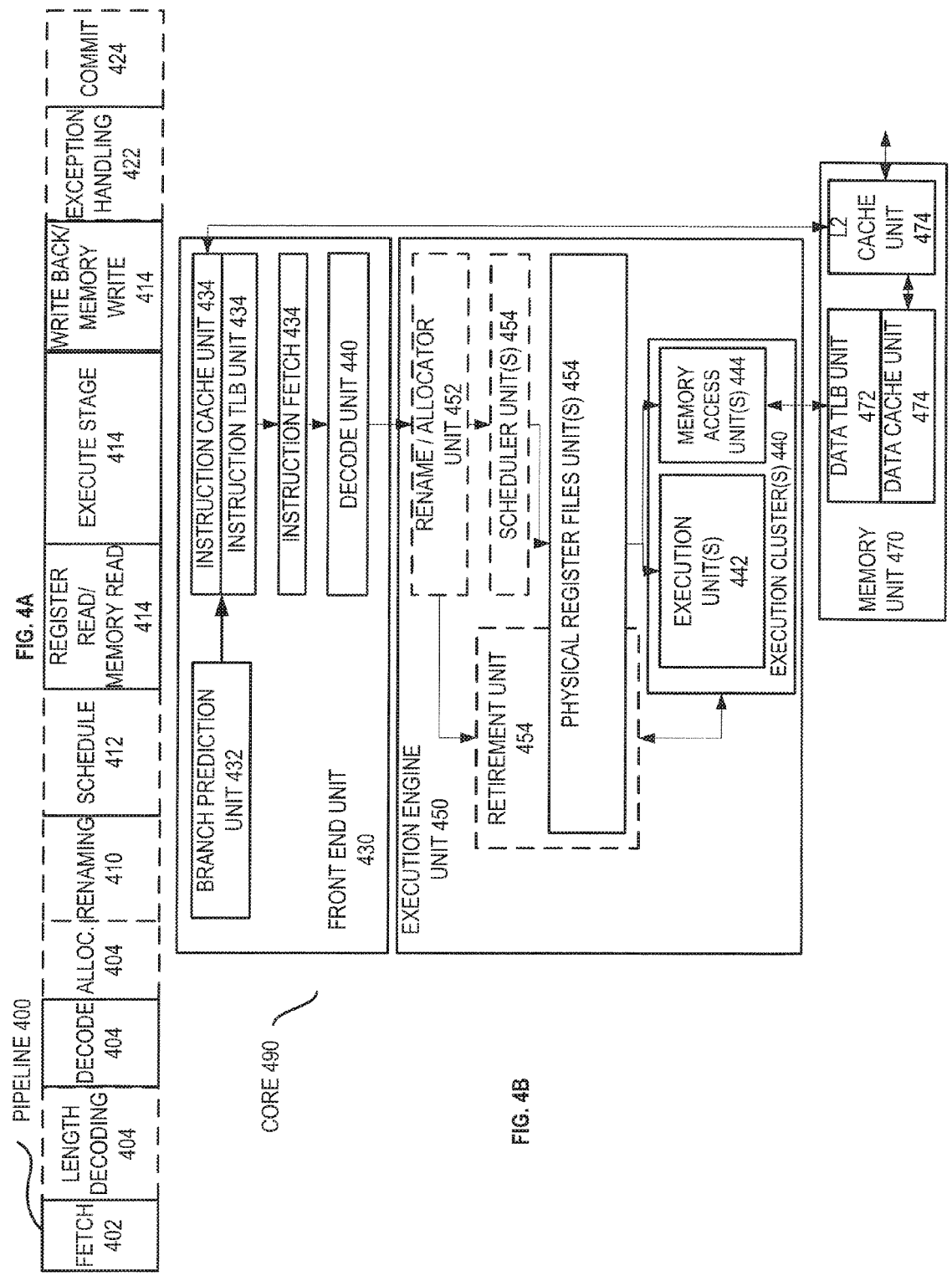

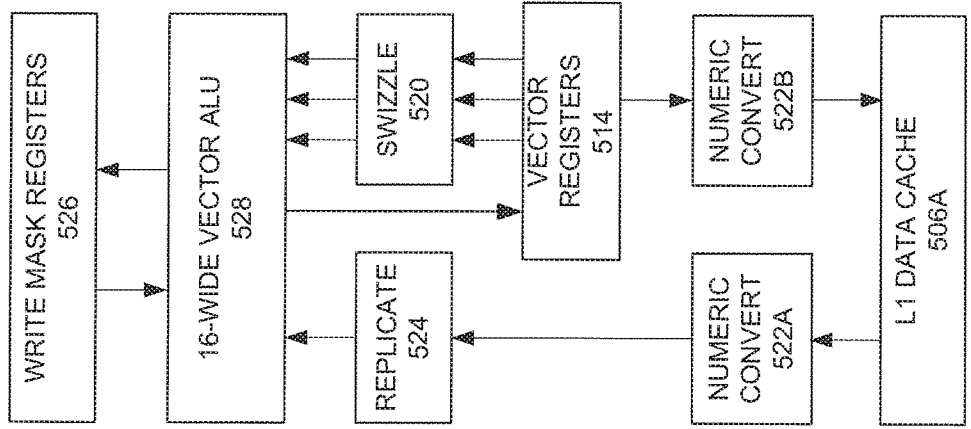
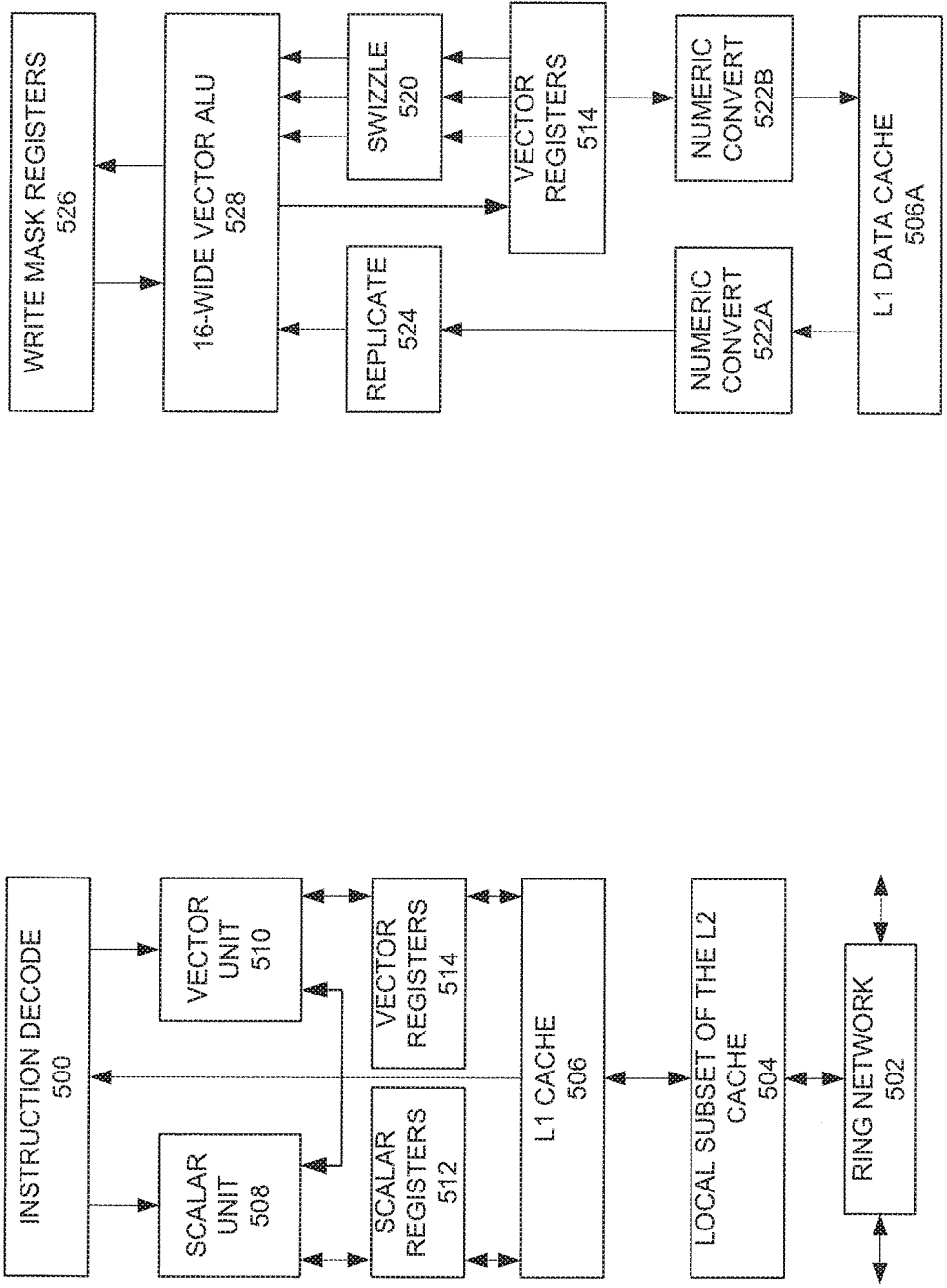

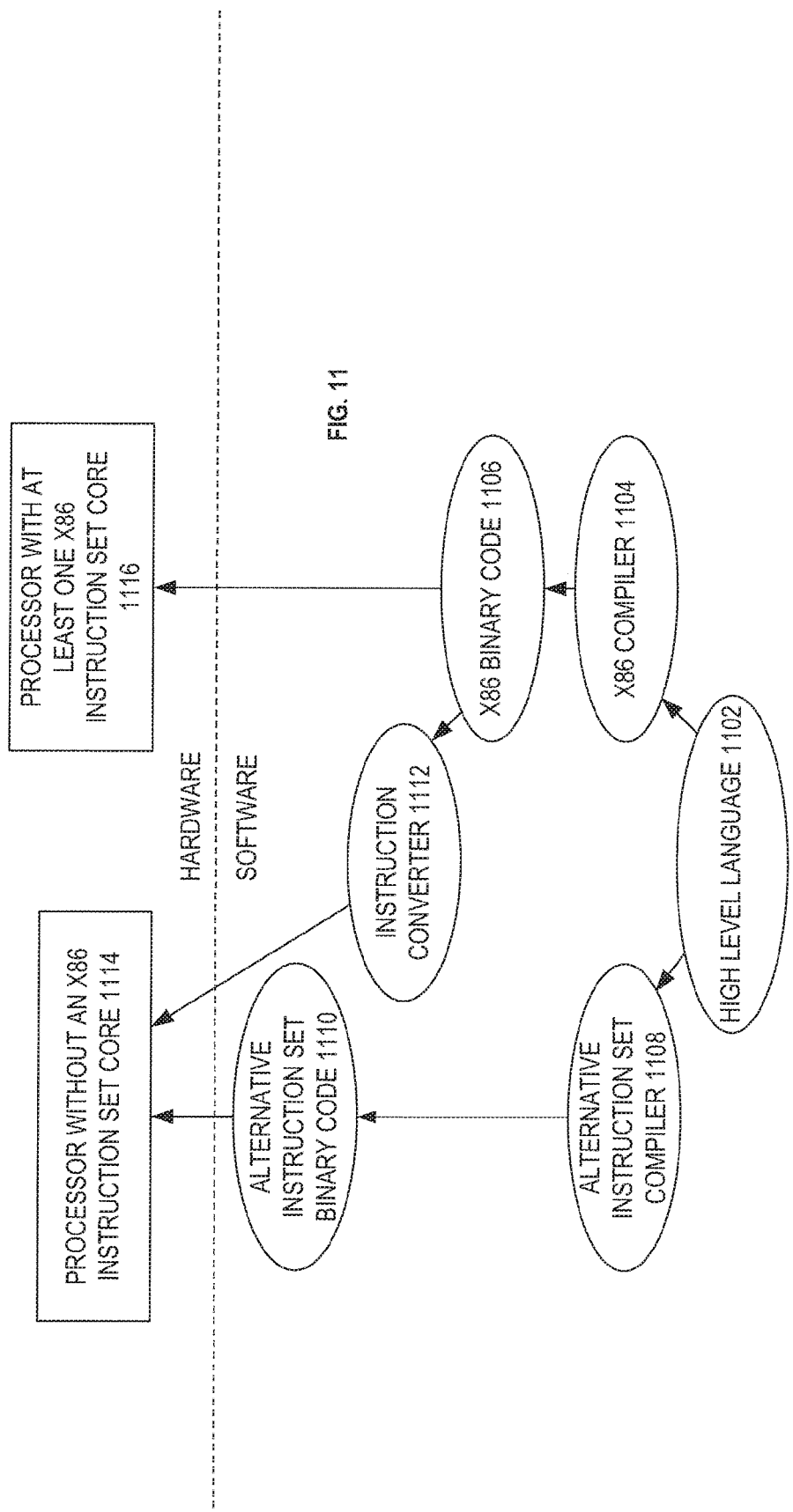

REAL TIME INSTRUCTION TRACE PROCESSORS, METHODS, AND SYSTEMS

RELATED APPLICATIONS

The present application is a continuation of U.S. patent application Ser. No. 13/730,834, filed on Dec. 29, 2012, entitled "REAL TIME INSTRUCTION TRACE PROCESSORS, METHODS, AND SYSTEMS", which is hereby incorporated herein by reference in its entirety and for all purposes.

BACKGROUND

Field

Embodiments relate to the field of instruction trace. In particular, embodiments relate to the field of real time instruction trace in processors.

Background Information

Multi-threaded and/or multi-core processors are commonplace today. They are used in various types of computing devices such as servers, desktops, laptops, netbooks, tablets, smartphones, and cell phones, to name just a few examples. It is currently expected that, at least for some processor segments, the trend to increasingly more threads and/or cores is going to continue into the future.

The multiple threads and/or cores generally help to improve performance by providing hardware parallelism which allows more instructions to be executed concurrently or in parallel. The multiple threads and/or cores have encouraged the development of multi-threaded or parallel processing software. For example, a multi-threaded application may include multiple threads that execute concurrently on different hardware threads, cores, or other logical processors.

During the execution of software various different types of events may alter the control flow of the software. Examples of such events include the execution of conditional branch instructions, jump instructions, subroutine call instructions, and asynchronous events (e.g., interrupts, exceptions, etc.). Tracing is often used to log or record information about the execution of software including information describing the control flow.

However, one challenge especially with such multi-threaded and/or multi-core processors is that debug tends to be more difficult as compared to single-threaded and/or single-core processors. Knowing the real time code execution flow is often challenging. As a result, debug may tend to take more time, which may lead to higher development costs and/or potential delays in bringing products to market. In addition, many existing methods of tracing tend to be highly performance intrusive.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 4A is a block diagram illustrating both an exemplary in-order pipeline and an exemplary register renaming, out-of-order issue/execution pipeline according to embodiments of the invention.

FIG. 4B is a block diagram illustrating both an exemplary embodiment of an in-order architecture core and an exemplary register renaming, out-of-order issue/execution architecture core to be included in a processor according to embodiments of the invention.

FIG. 5A is a block diagram of a single processor core, along with its connection to the on-die interconnect network and with its local subset of the Level 2 (L2) cache, according to embodiments of the invention.

FIG. 5B is an expanded view of part of the processor core in FIG. 5A according to embodiments of the invention.

FIG. 11 is a block diagram contrasting the use of a software instruction converter to convert binary instructions in a source instruction set to binary instructions in a target instruction set according to embodiments of the invention.

DETAILED DESCRIPTION

Disclosed herein are methods, processors, and systems for real time instruction trace (RTIT). In the following description, numerous specific details are set forth (for example specific RTIT logic implementations, RTIT packet formats, hardware/firmware partitioning details, logic partitioning/integration details, processor configurations, microarchitectural details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
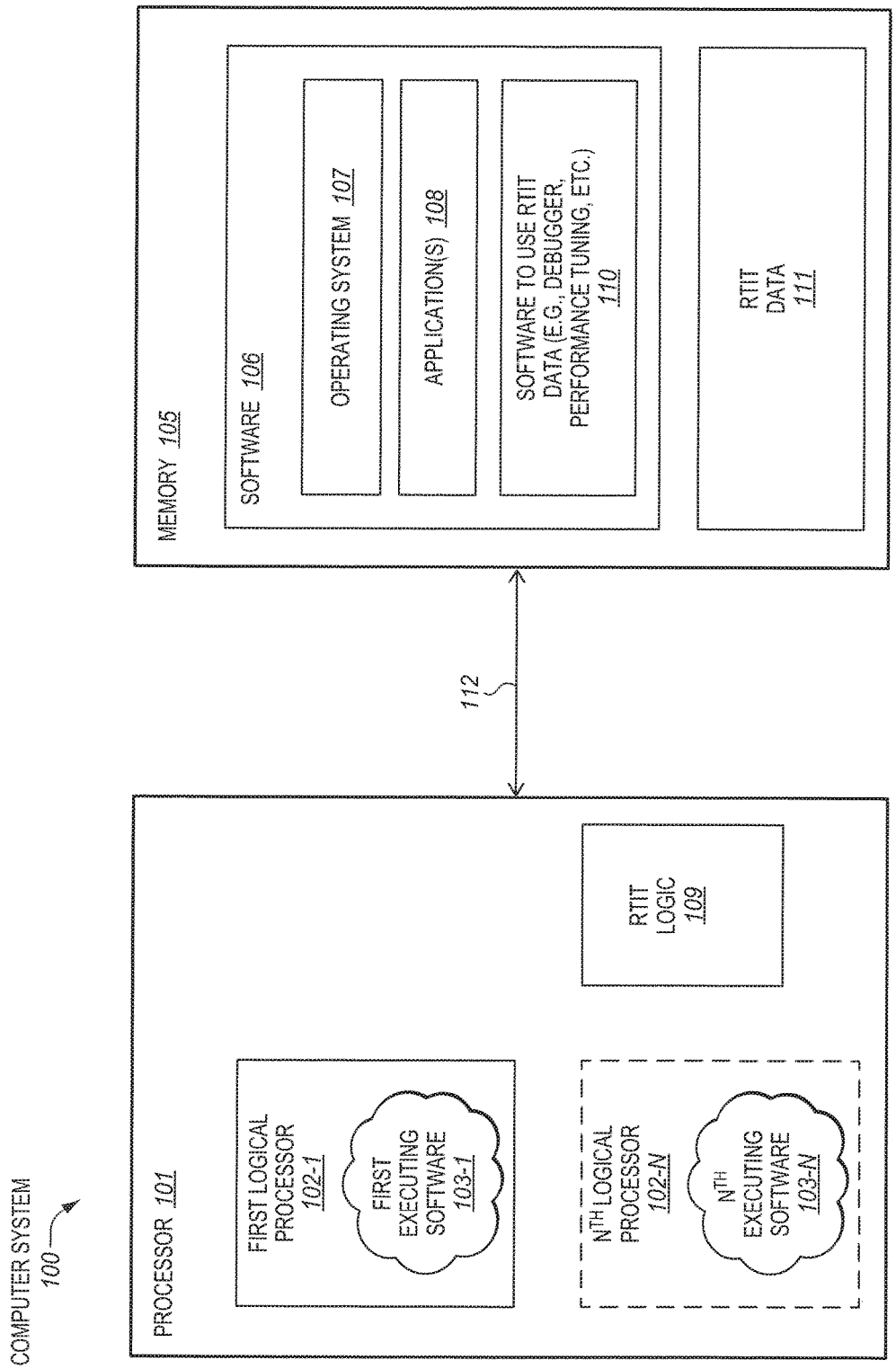
FIG. 1 is a block diagram of a computer system including an embodiment of a processor having an embodiment of real time instruction trace (RTIT) logic and a memory.

FIG. 1 is a block diagram of a computer system 100 including an embodiment of a processor 101 and a memory 105. The processor and the memory are coupled, or otherwise in communication with one another, by a conventional coupling mechanism 112 (e.g., through one or more buses, hubs, memory controllers, chipset components, or the like). The memory may include one or more memory devices and/or one or more different types of memory.

In some embodiments, the processor 101 may be a general-purpose processor (e.g., of the type used in desktop, laptop, netbook, tablet, smartphone, cell phone, server, and like computer systems). Alternatively, the processor may be a special-purpose processor. Examples of suitable special-purpose processors include, but are not limited to, communications processors, network processors, cryptographic processors, graphics processors, co-processors, embedded processors, digital signal processors (DSPs), and controllers (e.g., microcontrollers), to name just a few examples.

The processor includes at least a first logical processor 102-1 optionally up to an Nth logical processor 102-N, where N may be any appropriate number (e.g., from two to tens or even hundreds). Each logical processor may include logic to support and/or be independently associated with a software thread. Examples of suitable logical processors include, but are not limited to, a core, a hardware thread, a thread unit, a thread slot, a context unit, and/or other hardware and/or logic capable of executing instructions and holding state (e.g., an execution state and/or an architectural state).

Referring again to FIG. 1, the memory 105 includes software 106. In the illustrated embodiment, the software includes an operating system 107 and one or more applications 108. During operation, a portion of the software may execute on the processor as executing software 103. For example, the first logical processor may have first executing software (e.g., a first thread) 103-1 and the optional Nth logical processor may optionally have an Nth executing software (e.g., an Nth thread) 103-N. Although embodiments may be used for any number of logical processors (e.g., including a single logical processor), commonly the greatest benefit may be experienced when there are multiple or many such logical processors. In general, the more logical processors the more complicated the execution, and the more difficult debugging tends to be without the real time instruction trace embodiments disclosed herein.

The executing software may include macroinstructions or instruction set architecture (ISA) level instructions that are loaded from the software 106 and executed on the processor (e.g., scheduled, decoded, executed, etc.). By way of example, the instructions may include arithmetic instructions, load instructions, store instructions, and the like. In addition, the instructions may include one or more types of instructions that alter the flow of the software by branching, jumping, or otherwise moving around in the software. Examples of such instructions include, but are not limited to, branch instructions, conditional branch instructions, jump instructions, call instructions, and the like. In different architectures these instructions are sometimes referred to by different names. Generally these instructions involve moving to an instruction other than the next sequential instruction (e.g. by jumping over intervening instructions). Faults, interrupts, exceptions, or other similar asynchronous events may also alter program flow when they occur (e.g., by moving to a handler routine).

Referring again to FIG. 1, the processor also includes the embodiment of the real time instruction trace (RTIT) logic 109. The RTIT logic may be operable to generate and log, record, or store RTIT data about the execution of the software 103 including information about the control flow of the executing software. In some embodiments, the RTIT logic may store the RTIT data 111 in the memory 105. In some embodiments, different portions of the memory (e.g., different address ranges) may be used for each of the logical processors. In other embodiments, rather than storing the RTIT data to memory (e.g., as content in the memory that allows later post processing software to translate the RTIT data trace to the actual execution flow), the RTIT data may be output on processor pins (e.g., and used by the post processing software to translate the RTIT data trace to the actual execution flow).

In some embodiments, the RTIT logic may be operable to record trace information for all non-statically known program or control flow changes during the execution of the software. For example, the RTIT data 111 may include information to indicate whether conditional branches were taken or not taken, destination addresses of indirect jump and call instructions, origination and destination addresses for exceptions, interrupts, and like asynchronous events, etc. In some embodiments, the RTIT data may represent a full record or full live back trace of where the software actually executed in real time within the processor. Advantageously, the RTIT logic and RTIT data may allow a user to follow almost an endless number of control flow changes (e.g., from the beginning of the program flow to a failure, or area of slow performance) provided there is sufficient memory availability to store that amount of RTIT data.

The RTIT data 111 may be used for various different purposes. The scope of the invention is not limited to any known such use of the RTIT data. Examples of such possible uses include, but are not limited to, debugging (e.g., software functional debug and/or hardware debug), post silicon validation, diagnostic purposes, performance analysis and tuning, power analysis and tuning, and the like. The RTIT data may be used both during software/hardware development and after release of the software/hardware.

In some cases, the software may include one or more software applications 110 that use the RTIT data 111. By way of example, in the case of debugging, a practitioner may use debugging software to access the RTIT data and use it to obtain details about where the software actually executed for purposes of debugging. As another example, in the case of performance analysis and tuning, the practitioner may use performance analysis and tuning software to access and use the RTIT data to obtain details about where and how fast the software actually executed to analyze and tune performance.

The RTIT logic 109 is on-die and/or on-processor. The on-die/processor logic is fixed, resident, or persistent on-die/processor (e.g., as opposed to software instructions that are loaded into the processor from the memory). Commonly, the on-die/processor logic is present on the die/processor even when the processor is powered off, prior to booting, and/or at the time of completion of manufacture. In some embodiments, the on-die/processor logic includes a combination of hardware (e.g., integrated circuitry, transistors, registers, etc.), firmware (e.g., microcode), and/or other on-die/processor logic. The firmware may include a combination of persistent and/or non-volatile memory of the processor (e.g., read only memory (ROM), electrically programmable ROM (EPROM), flash memory, or the like.) and instructions (e.g., microcode, microinstructions, microarchitectural instructions, circuit level instructions that are lower-level than ISA instructions, or the like) stored in the persistent and/or non-volatile memory.

In some embodiments, the combination of hardware and firmware for the RTIT logic 109 may be selected to help to balance performance impact objectives with die size, power, and related objectives. It is also possible to implement the RTIT logic completely or almost completely in hardware. However, implementing the RTIT logic completely or almost completely in hardware may have a number of significant drawbacks. For one thing, this may involve a significant amount of hardware logic that may tend to increase the size (e.g., the processor silicon die area), manufacturing cost, and power consumption of the processor. In contrast to hardware, firmware generally uses significantly less size (e.g., less die area), has lower manufacturing cost, and generally also has less power consumption. However, in contrast to hardware, firmware generally has less performance and/or may tend to be more performance intrusive, since it shares resources with main flow processor operation. Accordingly, in some embodiments, the RTIT logic 109 may be implemented through a combination of hardware and firmware that is able to achieve a desired balance between performance intrusion and size, manufacturing cost, and power consumption. In some embodiments, the RTIT logic may be operable to provide a level of intrusiveness that ranges from about 2% to about 20% per logical processor, or from about 2% to about 15% per logical processor, or from about 2% to about 10% per logical processor, although this is not required. The level of intrusiveness may represent the decrease in performance when the RTIT logic is implemented compared to when the RTIT logic is not implemented (e.g., is disabled) for a given workload. The aforementioned levels of intrusiveness (e.g., the percentages) are suitable for embodiments but are not required. Other embodiments may use other levels of intrusiveness suitable for the particular implementation.

Figure 2:
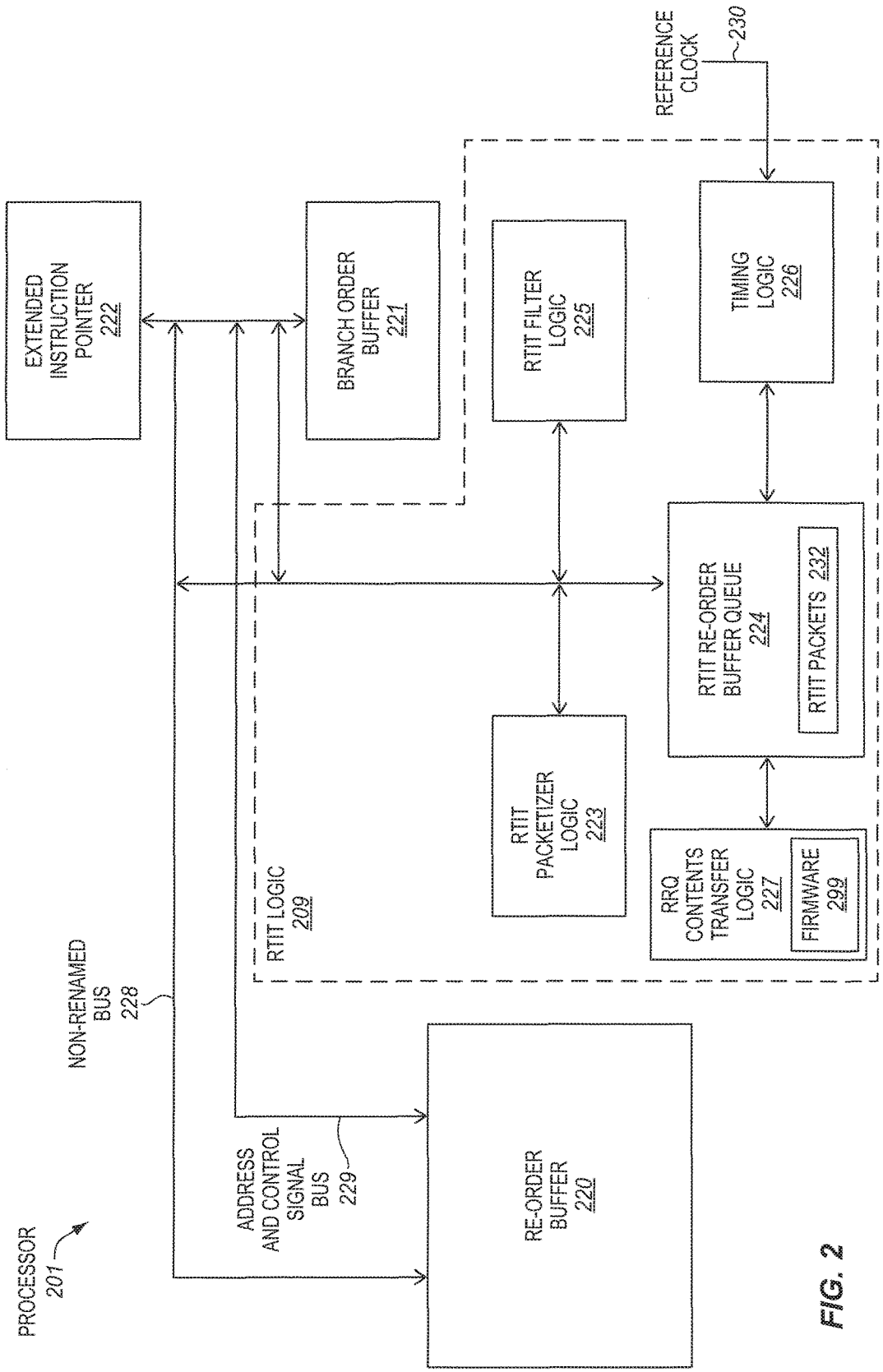
FIG. 2 is a block diagram of an embodiment of a processor having an embodiment of RTIT logic.

FIG. 2 is a block diagram of an embodiment of a processor 201 having an embodiment of RTIT logic 209. In some embodiments, the processor and RTIT logic of FIG. 2 may be included in the system of FIG. 1. Alternatively, the processor and RTIT logic of FIG. 2 may be included in a similar or different system. Moreover, the system of FIG. 1 may include either the same, similar, or different processor and RTIT logic than those of FIG. 2.

The RTIT logic 209 includes RTIT packetizer logic 223, an RTIT reorder buffer queue (RRQ) 224, an RTIT filter logic 225, timing logic 226, and RRQ contents transfer logic 227. In addition to the RTIT logic, the processor also includes a reorder buffer (ROB) 220, a branch order buffer (BOB) 221, an extended instruction pointer 222, a non-renamed bus 228, and an address and control signal bus 229. These components are coupled with one another by the arrows and busses. The ROB, BOB, and address and control signal bus 229 represent substantially conventional logic found in out-of-order (OOO) processors. For example, the ROB and BOB may be used to reorder instructions, which have been executed out of order, back into original program order.

The BOB 221 holds the information associated with each branch including the target address and other information such as the taken/non-taken indication. The ROB 220 provides the RTIT packetizer logic 223 information which operation is a branch, in which case, the BOB is read to provide the information associated with the branch, such as if the branch was taken and its destination address. In more complicate branches (like indirect branches) the firmware is also involved in the to and from branch addresses. The RTIT packetizer logic 223 is operable to generate RTIT packets and store the packets in the RTIT reorder buffer queue (RRQ) 224. In some embodiments, the RTIT packetizer logic may order and store the packets in the RRQ in a way that sufficiently fits the hardware resources.

Different types of RTIT packets are contemplated. One possible type of RTIT packet is a taken or not taken (TNT) packet. The TNT packet may indicate whether each of multiple conditional branches are taken or not taken. In some embodiments, the TNT packet may use a single bit per conditional branch. According to one possible convention, the bit may be given a first value (i.e., be set to binary 1) to indicate that a branch was taken, or the bit may be given a second value (e.g., be cleared to binary 0) to indicate that the branch was not taken. The opposite convention is also possible. Each TNT packet may record such information for a group of conditional branches. According to one example embodiment, each TNT packet may be an 8-bit byte and may be able to record the outcomes of up to six conditional branches (e.g. have six bits to indicate the outcome of up to six branches). Other embodiments may have wider or narrower TNT packets to record either fewer or more conditional branch outcomes.

Another possible type of RTIT packet is a target instruction pointer (TIP) packet. The TIP packet may indicate targets of indirect branches, jumps, transfers, far events, calls, and the like. The TIP packet may include a variable length destination address. According to one example embodiment, each TIP packet may be from about two to about seven bytes, although this is not required.

Yet another possible type of RTIT packet is a flow update (FUP) packet. The FUP packet may indicate a source address of an asynchronous event (e.g., an interrupt, exception, etc.) to log where the execution was at before the event. According to one example embodiment, each FUP packet may be from about three to about seven bytes, although this is not required.

Other possible examples of RTIT packets include, but are not limited to, timing and/or synchronization packets, packets to provide core-to-bus frequency ratios, packets to provide numbers of core cycles between packets, packets to stop or otherwise control instruction trace, packets to identify packet stream boundaries, and the like. These are just a few illustrative examples of suitable types of RTIT packets. Other embodiments may utilize different types of RTIT packets, additional RTIT packets, etc.

In some embodiments, the RTIT packetizer logic 223 may be implemented substantially entirely in hardware (i.e., at least 90% in hardware), or predominantly in hardware (i.e., more than 50% in hardware). In some embodiments, the RTIT packetizer logic may include some firmware (e.g., less than 50%), since allowing firmware to generate part of the RTIT packets may help to reduce the size of the RTIT packetizer hardware logic.

In some embodiments, the RTIT packetizer logic may be lightweight RTIT packetizer logic. The lightweight RTIT packetizer logic may be operable to generate and store packets in the RTIT reorder buffer queue (RRQ) with flexible or intelligent compression in a way that balances performance impact (or intrusion) with logic size, cost, and power consumption. Advantageously, the flexible or intelligent compression may reduce the amount of hardware logic without significantly impacting performance. For example, rather than storing the packets in the RRQ in a way that achieves highest levels of packing or compression, the lightweight RTIT packetizer logic may provide an intermediate level of compression or packing that leaves a certain amount of unused space between the packets in the RRQ. A significant amount of logic is generally needed in order to achieve the highest level and/or full compression (e.g., by eliminating the unused space or holes, etc.). In some embodiments, the lightweight RTIT packetizer logic may not provide full compression, because the input multiplexers and fill buffers needed for full compression would generally increase the size and power consumption more than warranted by the increase in performance that would be achieved. Providing an intermediate level of compression or packing may help to reduce some of this logic while still achieving a sufficiently low performance impact.

In some embodiments, in addition to and/or instead of such flexible/intelligent compression, another way to reduce the amount of logic of the RTIT packetizer logic is to have certain packets in a fixed location. For example, cycle packets may be inserted only in the first byte of 32 chunks. This means that the cycle packet may be located only in byte0, byte1 and byte3 or byte32, byte33, and byte34. But the cycle packet may have a length of one, two, or three bytes depending on the time passed since the last packet. As a result, in the event of a cycle packet of one byte, then the byte1 and byte2 may be space, which means holes are inserted, and in some embodiments such holes may be interpreted by the decoder as no-operations (NOPs). In some embodiments, a special packet of a NOP may be used to implement the holes.

Referring again to FIG. 2, the RTIT reorder buffer queue (RRQ) 224 is coupled with the RTIT packetizer logic 223. The RRQ is operable to store the RTIT packets 232. The RRQ may be filled out by the ROB hardware in the case of an indirect branch or by firmware in the case of a FAR branch or exception. In some embodiments, a separate RRQ may be included for each of one or more logical processors (e.g., hardware threads) of the processor and may be used to store RTIT packets for the corresponding logical processor. In some embodiments, each RRQ may be significantly larger than a conventional last branch record (LBR). The LBR is generally able to hold only a very limited number of branches (e.g., in some cases no more than about 10 to 20). Such a limited number of branch records may be encountered in a very short amount of time (e.g., a fraction of a second) and is often insufficient. In contrast, each RRQ may be significantly larger than a conventional LBR. For example, in some embodiments, each RRQ may have a size of at least 0.3 kilobytes, such as, for example, from about 0.3 to about 4 kilobytes, or from about 0.4 to about 4 kilobytes, or from about 0.5 to about 3 kilobytes, whereas a LBR is often not larger than about 0.2 kilobytes. These sizes are per-logical processor.

In some embodiments, the RRQ may be operable to be used by two or more logical processors concurrently. For example, the RRQ may correspond to a given core and may have different portions allocated to two or more different logical processors of that given core. In some embodiments, the portions of the RRQ may be fixedly or statically allocated to the different logical processors, which may help to reduce logic and/or provide a simpler implementation. In other embodiments, the portions of the RRQ may be capable of being dynamically allocated among the different logical processors, which may allow greater flexibility. For example, this may allow a portion of the RRQ that is allocated to a non-active logical processor to be reclaimed so that it may be used by an active logical processor.

In some embodiments, an existing last branch record (LBR) buffer may be reused and extended in size in order to implement the RRQ buffer. Such reuse of the LBR buffer may help to avoid an unnecessary increase in die area, manufacturing cost, etc. In this embodiment, the RRQ and LBR generally would not be used concurrently, but rather would be used alternatively. For example, a user may configure the system to use either the RRQ or the LBR. In other embodiments, separate LBR and RRQ buffers may optionally be included. In such embodiments, the separate LBR and RRQ may optionally and/or potentially be used concurrently.

Referring again to FIG. 2, the RTIT logic includes RTIT filter logic 225. The RTIT filter logic is coupled with the RTIT packetizer logic 223 and the RRQ 224. In some embodiments, the RTIT filter logic may be implemented predominantly in hardware, although this is not required. The RTIT filter logic is operable to filter execution that is to be traced from execution that is not to be traced. In various embodiments, the processor and/or the RTIT logic may allow a user or software (e.g., a debugging program) to specify which execution is to be traced and/or which is not to be traced. For example, this may allow execution of all software to be traced, execution of the operating system to be traced, or execution of one or more particular applications to be traced. In some embodiments, the RTIT filter logic may perform filtering based on address range and/or based on an operation mode. For example, in the case of address range filtering, the RTIT filter logic may compare addresses of executing software with a given or specified address range in order to determine whether or not the executing software is within the given address range. In one aspect, the address range may represent a page directory base value (e.g., from a CR3 control register in an Intel Architecture processor), or the like. In the case of operation mode, the filtering logic may filter based on privilege level (e.g., ring level 0, ring level 3, etc.). Advantageously, the RTIT filter logic may allow real time trace to be performed selectively on specific software, address ranges, operation modes, or the like, which may help to allow a practitioner or software application to focus the tracing on particular software and/or on particular bugs, errors, or the like.

Referring again to FIG. 2, the processor also includes a non-renamed bus 228. The non-renamed bus is coupled with the ROB 220, the extended instruction pointer 222, the BOB 221, and the RRQ 224. By way of example, the non-renamed bus may be used to transfer values stored in non-renamed registers (e.g., often located in the ROB) to a storage area associated with an operation stored temporarily in the reservation station till dispatch. These values may be read as a source of that operation when the operation is dispatched from the reservation station. However, conventionally the non-renamed bus width may be smaller than the RRQ line width. In some embodiments, the non-renamed bus may have a width equal to RRQ line width in order to allow the packets to be read efficiently from the RRQ (e.g., one line read from the RRQ per cycle or clock). For example, in some embodiments, the non-renamed bus may have a width of 64-bits for a 64-bit line width of the RRQ, although this particular width is not required.

The RTIT logic also includes timing logic 226. The timing logic may be operable to generate and provide packets to provide timing information that is useful for the RTIT logic. The timing logic may receive a reference clock signal 230 that is used to generate the timing information. Different types of timing information are contemplated. One possible type of timing information is a time stamp counter (TSC) value or packet representing the official processor wall clock timer. This may represent an architectural feature and may be synchronized on multi core and even on multi socket systems sharing the same reset signal. Another possible type of timing information is a sub-sampling of such a time stamp counter value. This is referred to as a mini time stamp counter (MTC) value or packet. For example, the mini time stamp counter value may be an 8-bit sub-set of a 56-bit time stamp counter value. Such a mini time stamp counter value may allow logging information relevant to the full time stamp counter value, and having the same synchronization, but in less bits. Yet another type of timing information is cycle information. The cycle information may be appended to other packets and may indicate the number of core cycles elapsed between consecutive packets. The cycle packets may be issued with core clock resolution.

Such timing information is useful for estimating when instructions were executed. In the case of multiple cores, the timing information may be useful for calculating when the instructions were executed on cores with respect to other cores and with respect to wall clock time. Such timing information is also useful to allow the RTIT logic to find and correct performance issues and/or for performance tuning. For example, the timestamp information may be used to determine what portions of code execute fast and what portions of code execute slow. When the RTIT logic is used, the traced program execution rate/speed is typically affected (i.e., typically reduced) as compared to if the RTIT logic were not used. As a result, the timing information in the packets generally does not perfectly/precisely indicate the real program execution rate/speed, but rather may serve as a useful estimate thereof.

The RTIT logic also includes RRQ contents transfer logic 227. In some embodiments, the RRQ contents transfer logic is implemented predominantly in firmware potentially combined with a lesser amount of hardware. As shown, the RRQ contents transfer logic 227 includes firmware 299. The RRQ contents transfer logic is operable to transfer contents from the RRQ to memory (e.g., memory 205). In some embodiments, this may be done when the RRQ is full or almost full (e.g., when the RRQ has a capacity that meets a fullness threshold). In other embodiments, this may be done periodically or continuously to help prevent the RRQ from becoming completely full. Further details of a suitable embodiment of the RRQ contents transfer logic will be shown and described in conjunction with FIG. 3.

The processor also includes an address and control signal bus 229. The address and control signal bus is coupled with the BOB 221, the ROB 220, and the RTIT packetizer logic 223. The ROB is often responsible for the committed branches. The BOB may hold the information associated with a branch. Using a dedicated array for branches (e.g., the BOB) may help to save die area since not all entries in the ROB need to save the information associated with a branch. On a taken branch, the ROB may read the branch target address from the BOB on the address and control signal bus, and use it to calculate the instruction pointer. The address and control signal bus 229 may provide to the RTIT packetizer logic 223 information about which branch was taken and/or not-taken and its address.

In some embodiments, the RTIT logic 209 may be fully contained within a core. This may offer certain advantages, since branches may occur per logical processor (of which in some embodiments each core may have a plurality). In other embodiments, in order to save die area, a portion of the RTIT logic may optionally be implemented in an uncore portion of the processor outside of the cores. For example, the RRQ logic and logic to indicate each logical processor RTIT trace may be included in the uncore portion of the processor, since each logical processor trace may be stored in a different corresponding memory location. Alternatively, other portions of the RTIT logic may optionally be included in the uncore portion of the processor. The choice between locating logic in the core or uncore may be determined in a way that is appropriate for the particular implementation (e.g., in a way that appropriately trades off die area saving in the core vs. die area, routing and complexity in the uncore).

To avoid obscuring the description, a relatively simple processor has been shown and described. In other embodiments, the processor may optionally include other well-known components, such as, for example, an instruction fetch unit, an instruction scheduling unit, a branch prediction unit, an instruction decoder, microinstruction queues, an execution unit, microinstruction sequencers, registers, a register renaming unit, instruction and data caches, instruction and data translation lookaside buffers, bus interface units, second or higher level caches, a retirement unit, other components included in processors, and various combinations thereof. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC).

Figure 3:
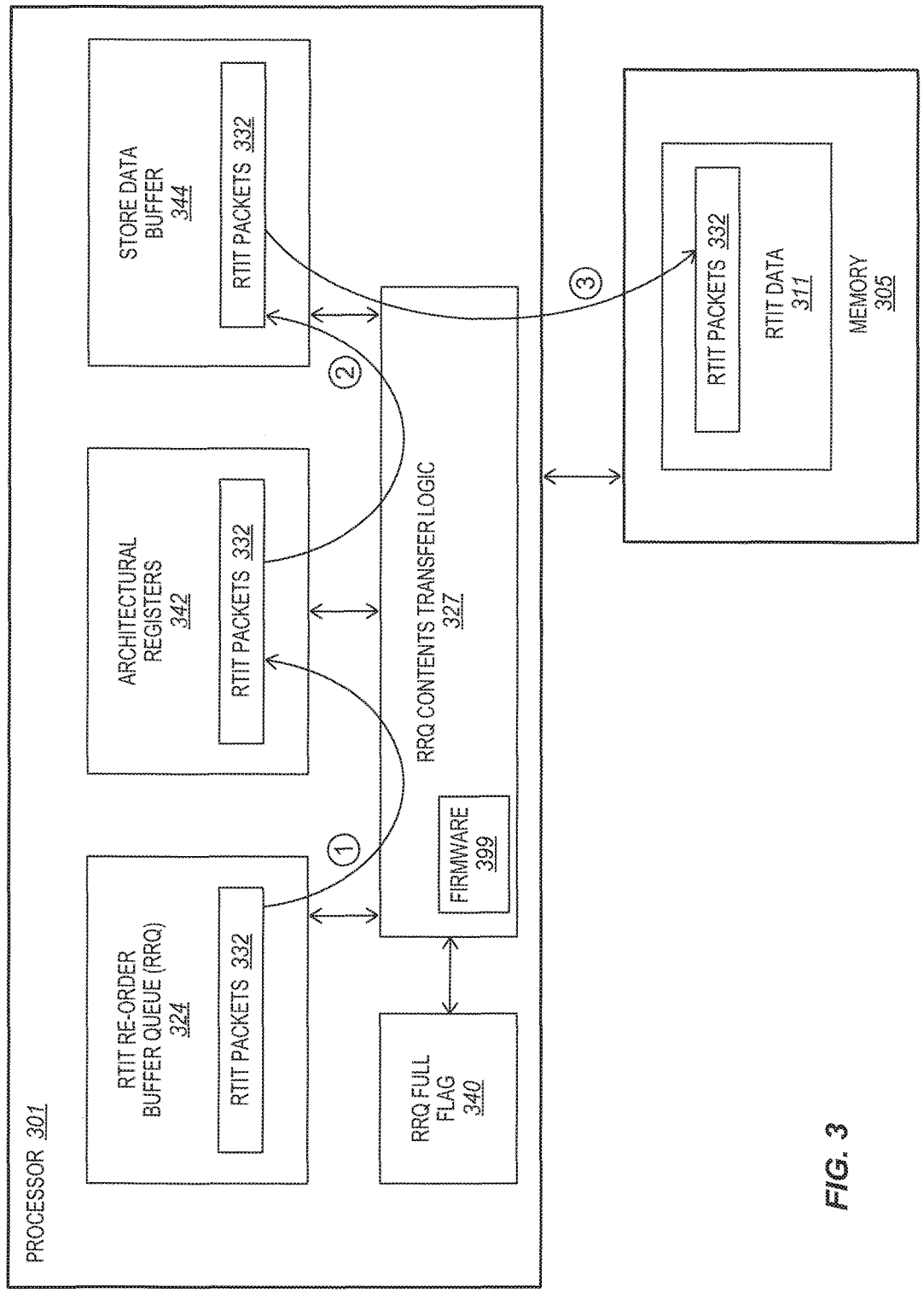
FIG. 3 is a block diagram of an embodiment of a processor having an example embodiment of RTIT reorder buffer queue (RRQ) contents transfer logic that is operable to transfer contents of an RRQ to memory.

FIG. 3 is a block diagram of an embodiment of a processor 301 having an example embodiment of RRQ contents transfer logic 327 that is operable to transfer contents of an RRQ 324 to memory 305. In some embodiments, the RRQ contents transfer logic may initiate the transfer when the RRQ is full, almost full, meets a fullness threshold, continuously or periodically throughout time, or the like. For example, when the RRQ is full or almost full (e.g., meets a fullness threshold), hardware of the processor may set an RRQ full flag or bit 340 that results in RRQ contents transfer (e.g., causes a special assistance request to the RRQ contents transfer logic).

The RRQ contents transfer logic 327 includes firmware 399. In some embodiments, the RRQ contents transfer logic may be implemented predominantly (i.e., more than 50%) in firmware (e.g., microcode, microinstructions, circuit-level instructions stored in non-volatile memory, etc.) potentially with a lesser amount of hardware. For example, in some embodiments, the RRQ contents transfer logic may be implemented in from about 50% to 90% firmware with the remainder being made up of hardware (e.g., to interface with the RRQ, perform other functions best suited for hardware, etc.). In some embodiments, the RTIT contents transfer logic may include a firmware service subroutine. It would also be possible to implement the RRQ contents transfer logic entirely or predominantly in hardware, although this generally has certain drawbacks. For one thing, a significant amount of hardware logic is generally needed in order to implement the RRQ contents transfer logic entirely or predominantly in hardware. Such a large amount of hardware logic may tend to increase the size (e.g., the die area), manufacturing cost, and power consumption of the processor. In contrast, firmware generally takes significantly less size, has less manufacturing cost, and has less power consumption than hardware logic. Although firmware may have less performance than hardware, implementing the RRQ contents transfer logic predominantly in firmware (e.g., from 51% to 90%), generally provides an appropriate level of performance without unnecessarily increasing the size, manufacturing cost, and power without.

As shown at numeral (1), in some embodiments, the RRQ contents transfer logic 327 may transfer or store a set of one or more RTIT packets 332 from the RRQ to one or more architectural registers 342. The architectural registers may be those registers referenced as sources and/or destinations by ISA level instructions of the processor (e.g., write instructions, store instructions, etc.). Then, as shown at numerals (2) and (3), in some embodiments, a write or other operation may be performed to transfer, or otherwise store the set of RTIT packets from the architectural registers 342 to RTIT data 311 in the memory 305. In some embodiments, the RRQ transfer logic, which may be implemented predominantly by a firmware routine or function, may fast evict the contents of the RRQ to the architectural registers in a tight loop, and then perform a write operation to transfer the contents of the architectural registers on to memory 305. Transferring the contents of the RRQ to memory may help to free additional space in the RRQ. In some embodiments, the RRQ contents transfer logic may continue to transfer the contents of the RRQ to the memory until the RRQ has a sufficient amount of free space.

In some embodiments, the write or other operation shown at numerals (2) and (3) may indicate the set of RTIT packets in the architectural registers as uncacheable speculative write combining (USWC). USWC is a known cache attribute type in Intel Architecture processors. Analogous attributes in other architectures may also be used. Indicating the set of RTIT packets as having the USWC attribute may allow the RTIT packets to be stored directly to the memory bypassing one or more cache levels of the processor. The USWC operation may accumulate stores in internal buffers before going out to memory which may help to reduce memory bus transactions. This may help to avoid polluting the one or more levels of cache with the RTIT packets (i.e., the RTIT packets will not tie up cache entries). Use of USWC helps to reduce the intrusiveness. Alternatively, in other embodiments, the write or store operation of the packets from the architectural registers to the memory may be a cacheable store operation. In addition, in some embodiments, physical addresses rather than linear addresses may be stored, which may help to bypass the paging translation and may tend to be more convenient for debugging systems, although this is not required.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashedlined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bidirectional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Processor with Integrated Memory Controller and Graphics

Figure 6:
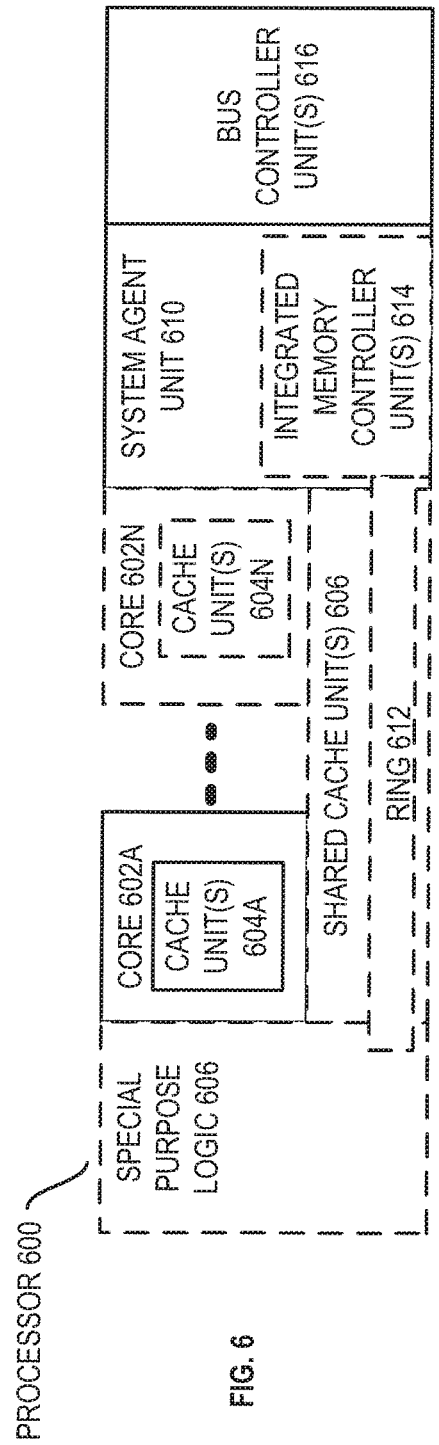
FIG. 6 is a block diagram of a processor that may have more than one core, may have an integrated memory controller, and may have integrated graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multithreading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
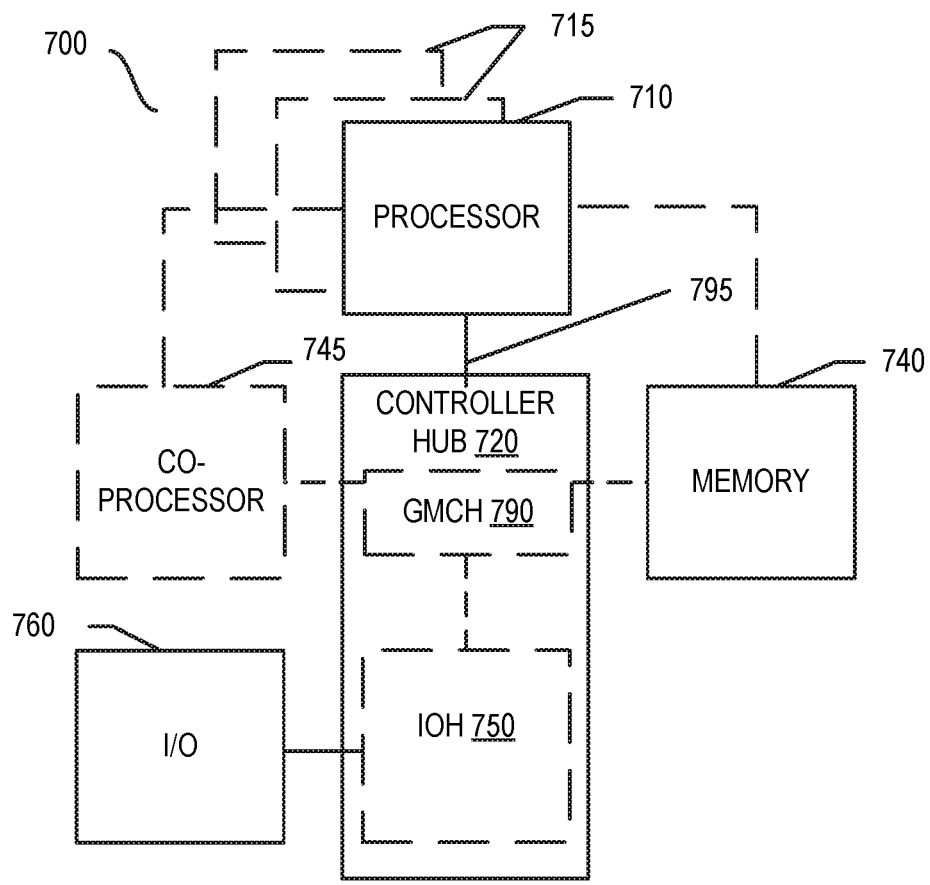
FIG. 7, shown is a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
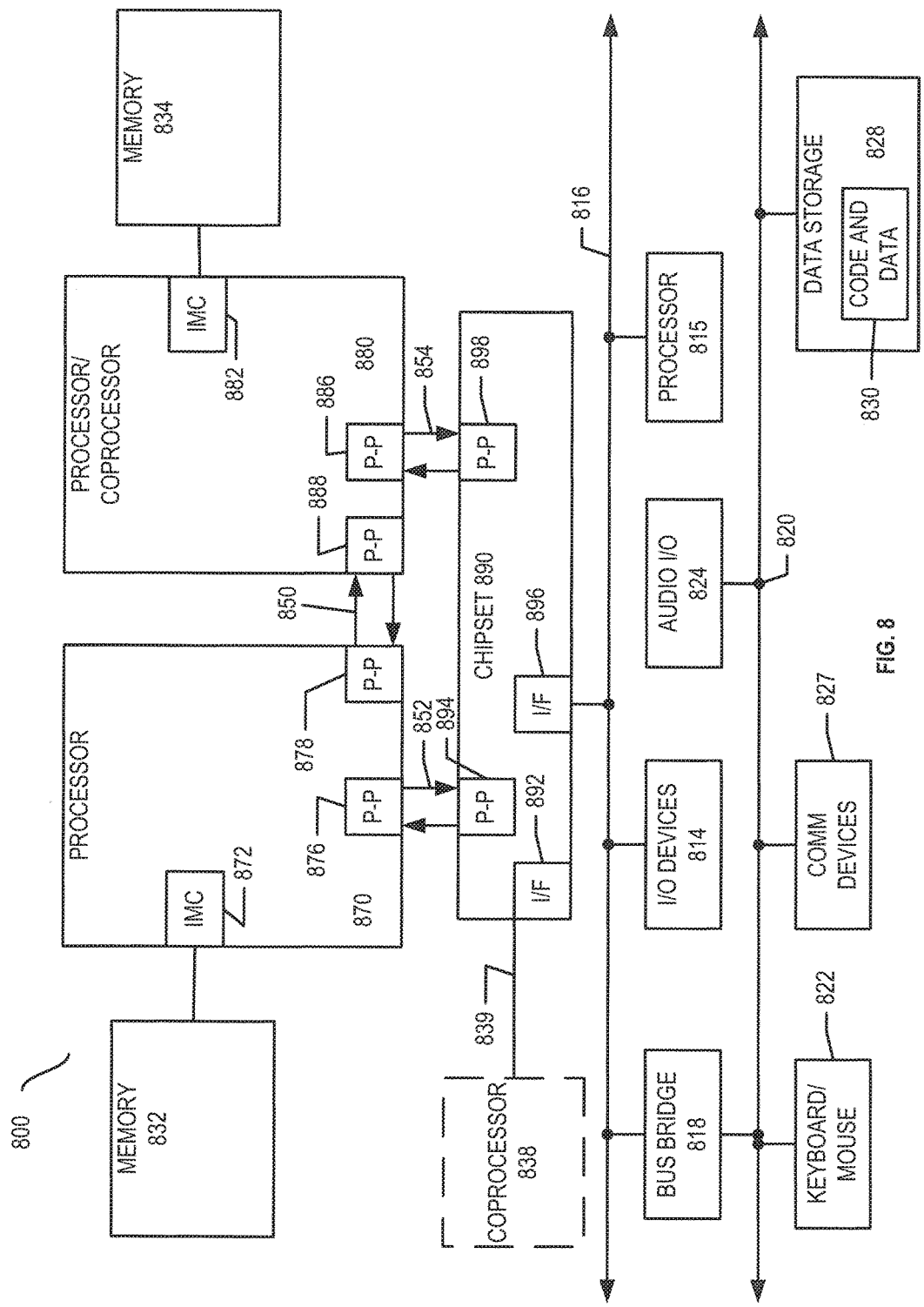
FIG. 8, shown is a block diagram of a first more specific exemplary system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850.

Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
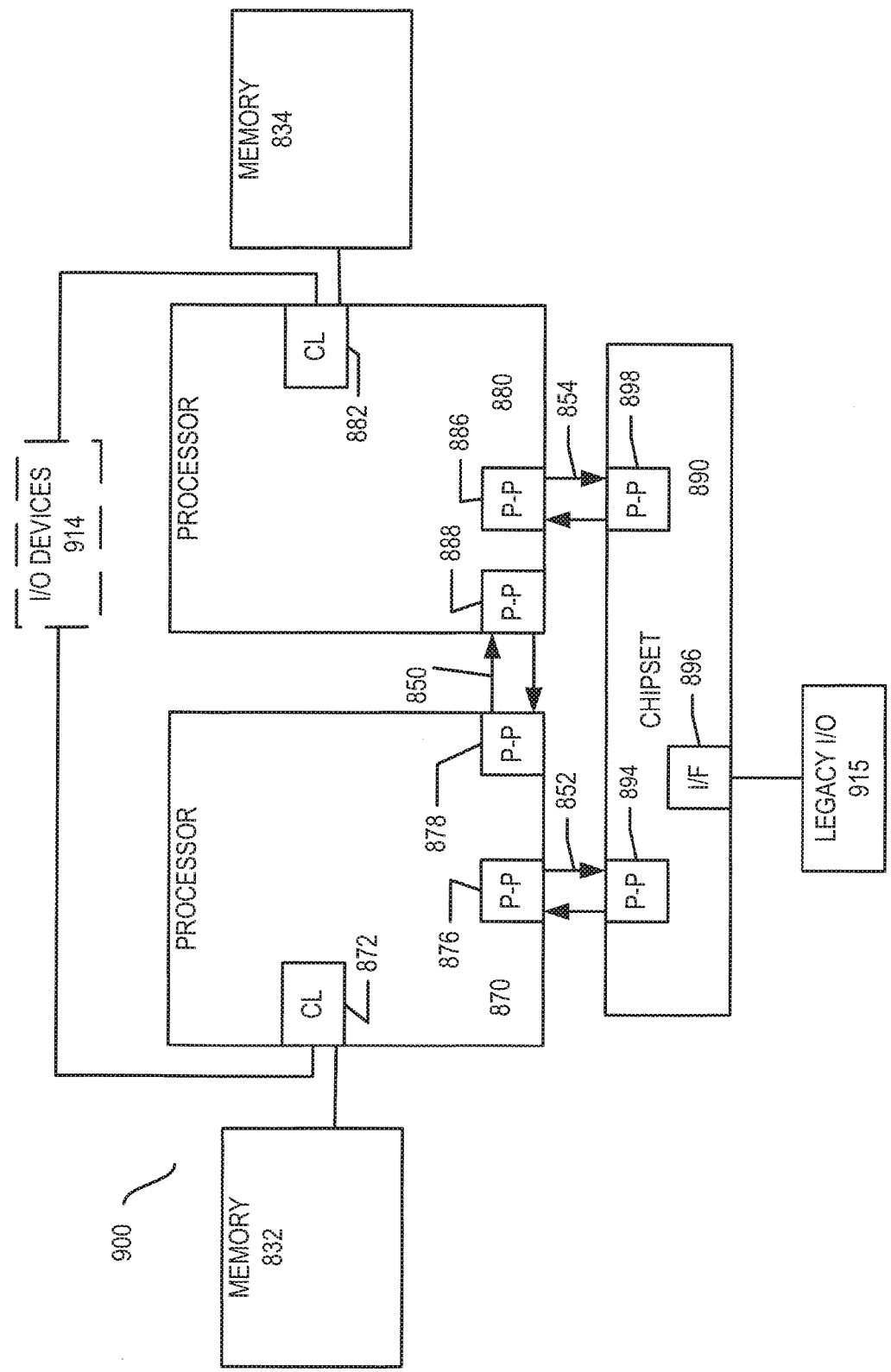
FIG. 9, shown is a block diagram of a second more specific exemplary system in accordance with an embodiment of the present invention.

Referring now to FIG. 9, shown is a block diagram of a second more specific exemplary system 900 in accordance with an embodiment of the present invention Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
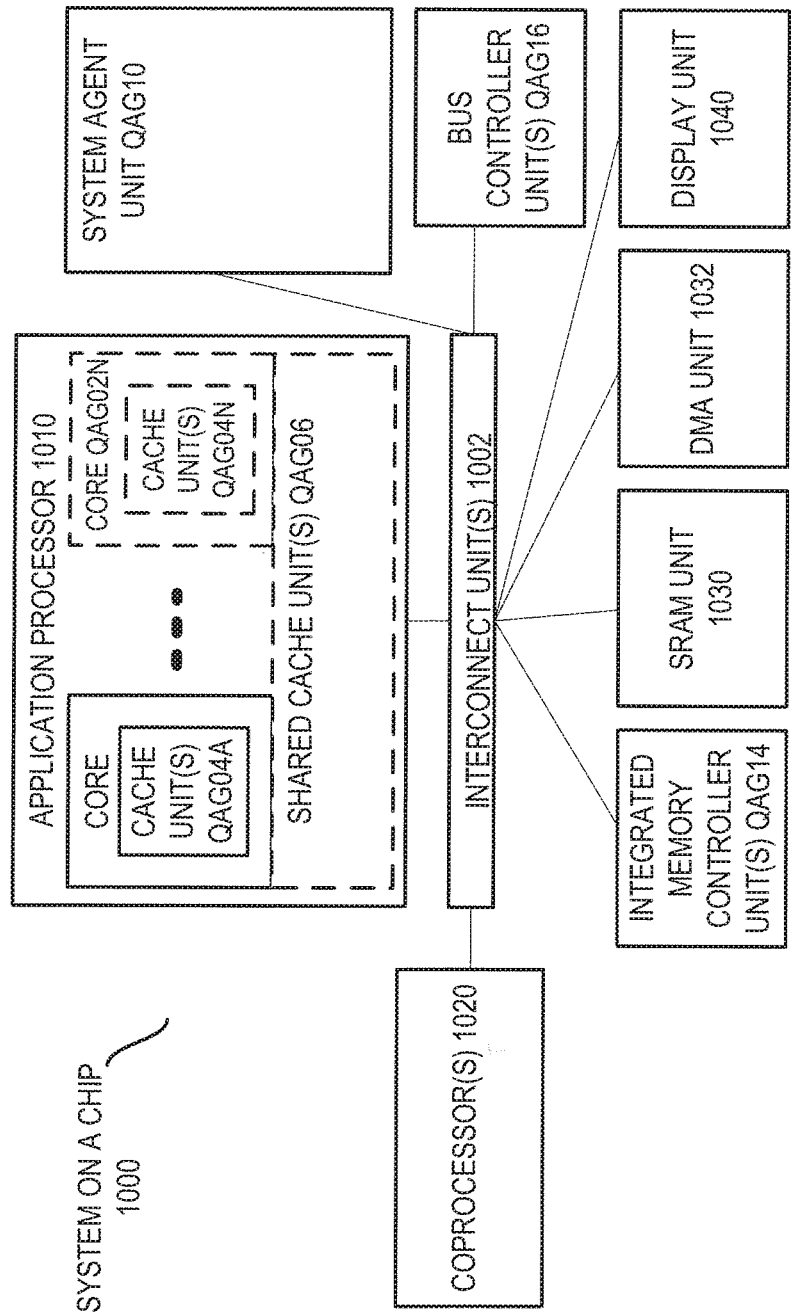
FIG. 10, shown is a block diagram of a SoC in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar or the same characteristics unless specified or clearly apparent otherwise. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. The components, features, and specific optional details described herein for the apparatus may also optionally apply to the methods described herein, which may in embodiments be performed by and/or within such apparatus.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, a sequence of instructions, which if executed by a machine causes the machine to perform one or operations, methods, or techniques disclosed herein. In some embodiments, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or the like. The tangible medium may include one or more solid or tangible physical materials, such as, for example, a semiconductor material, a phase change material, a magnetic material, etc. Examples of suitable machines include, but are not limited to, desktop, laptop, notebooks, netbook nettops, tablet, smartphone, cell phone, Mobile Internet devices (MIDs), server, network elements (e.g., routers, switches, etc.), set-top boxes, video game controllers, and like computing systems, and other electronic devices having one or more processors.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus comprising:
   real time instruction trace (RTIT) logic including:
   RTIT packetizer logic on a chip to generate RTIT packets for a first software, the RTIT packets to indicate a flow of the first software;
   an RTIT queue on the chip and coupled with the RTIT packetizer logic, the RTIT queue to store the RTIT packets; and
   RTIT queue contents transfer logic coupled with the RTIT queue, the RTIT queue contents transfer logic to transfer the RTIT packets out of the RTIT queue, wherein the RTIT queue contents transfer logic is implemented predominantly not in hardware on the chip.

2. The apparatus of claim 1, wherein the RTIT queue contents transfer logic is implemented predominantly in firmware on the chip.

3. The apparatus of claim 1, wherein the RTIT queue contents transfer logic comprises a firmware service subroutine.

4. The apparatus of claim 1, wherein the RTIT queue contents transfer logic is to transfer the RTIT packets to a set of architectural registers.

5. The apparatus of claim 1, wherein at least a portion of the RTIT queue is capable of being configured as a last branch record (LBR).

6. The apparatus of claim 1, further comprising a non-renamed bus coupled with the RTIT packetizer logic, the non-renamed bus having a width in bits that is at least as large as a width of a line of the RTIT queue.

7. The apparatus of claim 1, wherein a size of the RTIT queue corresponding to the first software ranges from 0.3 to 4 kilobytes.

8. The apparatus of claim 1, wherein the RTIT packetizer logic is implemented predominantly in hardware on the chip.

9. The apparatus of claim 1, wherein the RTIT packetizer logic is to perform an intermediate level of compression in which non-operations (NOPs) are left between RTIT packets in the RTIT queue.

10. The apparatus of claim 1, wherein the RTIT packetizer logic is to store packets of a given type in fixed locations of chunks.

11. The apparatus of claim 1, wherein the RTIT logic is to provide a level of intrusiveness that ranges from 2% to 20% for the first software.

12. A chip comprising:
    real time instruction trace (RTIT) logic including:
    RTIT packetizer logic on the chip to generate RTIT packets for a first software, the RTIT packets to indicate a flow of the first software;
    an RTIT queue on the chip and coupled with the RTIT packetizer logic, the RTIT queue to store the RTIT packets; and
    RTIT queue contents transfer logic coupled with the RTIT queue, the RTIT queue contents transfer logic to transfer the RTIT packets out of the RTIT queue, wherein the RTIT queue contents transfer logic is implemented predominantly in logic on the chip and predominantly not in hardware on the chip.

13. The chip of claim 12, wherein at least a portion of the RTIT queue is capable of being configured as a last branch record (LBR).

14. The chip of claim 12, further comprising a non-renamed bus coupled with the RTIT packetizer logic, the non-renamed bus having a width in bits that is at least as large as a width of a line of the RTIT queue.

15. The chip of claim 12, wherein the RTIT packetizer logic is implemented predominantly in hardware on the chip.

16. The chip of claim 12, wherein the RTIT packetizer logic is to perform an intermediate level of compression in which non-operations (NOPs) are left between RTIT packets in the RTIT queue.

17. An apparatus comprising:
    real time instruction trace (RTIT) logic including:
    RTIT packetizer logic on a chip to generate RTIT packets for a first software, the RTIT packets to indicate a flow of the first software;
    an RTIT queue on the chip and coupled with the RTIT packetizer logic, the RTIT queue to store the RTIT packets, wherein at least a portion of the RTIT queue is capable of being configured as a last branch record (LBR); and
    RTIT queue contents transfer logic coupled with the RTIT queue, the RTIT queue contents transfer logic to transfer the RTIT packets out of the RTIT queue.

18. The apparatus of claim 17, wherein the RTIT queue contents transfer logic comprises a firmware service subroutine.

19. The apparatus of claim 17, wherein the RTIT queue contents transfer logic is to transfer the RTIT packets to a set of architectural registers.

20. The apparatus of claim 17, further comprising a non-renamed bus coupled with the RTIT packetizer logic, the non-renamed bus having a width in bits that is at least as large as a width of a line of the RTIT queue.

21. The apparatus of claim 17, wherein a size of the RTIT queue ranges from 0.3 to 4 kilobytes corresponding to the first software.

22. The apparatus of claim 17, wherein the RTIT packetizer logic is implemented predominantly in hardware.

23. The apparatus of claim 17, wherein the RTIT packetizer logic is to perform an intermediate level of compression in which non-operations (NOPs) are left between RTIT packets in the RRQ.

24. The apparatus of claim 17, wherein the RTIT packetizer logic is to store packets of a given type in fixed locations of chunks.

* * * * *